United States Patent [19]

Cannon, Jr. et al.

[11] Patent Number: 4,793,683
[45] Date of Patent: Dec. 27, 1988

[54] OPTICAL FIBER CONNECTOR

[75] Inventors: Thomas C. Cannon, Jr., Dunwoody; Bruce V. Darden, Lawrenceville; Norman R. Lampert, Norcross, all of Ga.

[73] Assignee: American Telephone and Telegraph Company, AT&T Bell Laboratories, Murray Hill, N.J.

[21] Appl. No.: 861,198

[22] Filed: May 8, 1986

[51] Int. Cl.⁴ ............................................. G02B 6/38
[52] U.S. Cl. .............................. 350/96.21; 350/96.2
[58] Field of Search ................ 350/96.20, 96.21, 96.22

[56] References Cited

U.S. PATENT DOCUMENTS

| | | | |
|---|---|---|---|
| 4,057,322 | 11/1977 | Kao | 350/96.20 X |
| 4,113,346 | 9/1978 | Jackson et al. | 350/96.20 |
| 4,203,650 | 5/1980 | Millet et al. | 350/96.21 |
| 4,240,695 | 12/1980 | Evans | 350/96.21 |
| 4,272,154 | 6/1981 | Bachel | 350/96.22 |
| 4,300,815 | 11/1981 | Malsot et al. | 350/96.20 |
| 4,353,620 | 10/1982 | Schultz | 350/96.21 |
| 4,414,697 | 11/1983 | Hartley | 7/107 |
| 4,458,985 | 7/1984 | Balliet et al. | 350/96.21 |
| 4,512,630 | 4/1985 | Runge | 350/96.21 |
| 4,687,291 | 8/1987 | Stape et al. | 350/96.21 |

FOREIGN PATENT DOCUMENTS

| | | |
|---|---|---|
| 0095281 | 11/1983 | European Pat. Off. . |
| 0148544 | 11/1979 | Japan ................ 350/96.21 |
| 0019915 | 2/1984 | Japan ................ 350/96.2 |
| 2022284 | 12/1979 | United Kingdom . |

OTHER PUBLICATIONS

Young et al; "Design and Performance of the Biconic Connector used in the FT3 Light Wave System"; 30th International Wire & Cable Symposium Proceedings, 1981; pp. 411–418.

Publications: Y. Kawamura et al, "Optical Connections for Singlemode Fibers", Lasers and Applications, Sep. 1984, beginning at page 57, Preview of Products at OFC/OFS +85", Lasers and Applications, p. 92.

Primary Examiner—John D. Lee
Assistant Examiner—John Ngo
Attorney, Agent, or Firm—Edward W. Somers

[57] ABSTRACT

In an optical fiber connector (20), an alignment sleeve (66) for holding two conically shaped portions (30-30) of plugs (24-24) each of which terminates an optical fiber (25) includes two conically shaped cavities (68,70) communicating through a common plane (72). A peripheral end portion of at least one end of the sleeve is provided with a notch (86). The notch is adapted to receive a key (43) which projects from a plug as the plug is inserted into the sleeve cavity. This locks the plug in the sleeve and prevents unintended rotation of the plug relative to the sleeve which could abrade opposing end faces of the fibers when a threaded cap in which the plug is mounted is turned into a coupling housing (57) which supports the sleeve and which already has another plug mounted therein. This connector improves insertion loss and performance repeatability by causing fiber core centroids (170,173) of optical fibers terminated by plugs received in the housing to be disposed in a common plane which extends radially from a longitudinal axis of the connector.

22 Claims, 7 Drawing Sheets

_Fig_4  _Fig_5

_Fig_6  _Fig_7

OPTICAL FIBER CONNECTOR

TECHNICAL FIELD

This invention relates to optical fiber connectors. More particularly, this invention relates to biconic optical fiber connectors in which damage to end faces of plugs being mounted in an alignment sleeve is prevented and in which insertion loss and performance repeatability are improved.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that the low loss optical fibers which are produced today are not diminished in their effectiveness in systems, the fibers must be connected through intermateable connectors which preserve those low losses. For optical fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See, for example, an article entitled "Interconnection for Lightguide Fibers" which was authored by T. L. Williford et al. and which appeared in the Winter 1980 issue of the *Western Electric Engineer* beginning at page 87. That connector includes a coupling having a housing in which is mounted a biconic alignment sleeve. The sleeve includes two truncated, conically shaped cavities which communicate with each other through a common place which has the least diameter of each cavity. Each of two optical fibers to be connected is terminated with a plug comprising a primary pedestal or truncated, conically shaped end portion which is adapted to be received in one of the cavities of the sleeve. Each fiber extends through the plug in which it is mounted and has an end which terminates in a secondary pedestal of the plug. The plug is held in a cap having an externally threaded portion adapted to be turned into an internally threaded entrance portion of the housing. At least portions of the conically shaped surfaces of the plug and of the sleeve serve as alignment surfaces and are intended to be conformable. The plug is urged into seated engagement with the wall defining the cavity in which it is received while the cap is turned into the housing.

Minimal loss between the connected fibers is achieved when the optical fibers which are terminated by the plugs are aligned coaxially and when the fiber end faces, each of which is planar, contact in a common plane. Considering the size of the fibers, for example one with a core diameter of 8 microns and a cladding diameter of 125 microns, the task of providing comformable, conical plug and sleeve surfaces in order to meet alignment and end separation requirements is a formidable one.

The alignment sleeves as molded are checked for accuracy by measuring the distance between reference circumferences of the walls of opposing cavities. If the distance is too long, the plugs may seat within the cavities, but the end separation of the fiber end faces is too great. One the other hand, if the distance is too short, the secondary pedestals touch, but there is insufficient contact between the alignment surfaces. Further, if the fiber end faces contact each other prior to seating the conformable portions of the alignment surfaces of the plugs, the fibers within the plugs may become misaligned or the fiber end faces may become damaged. Also important is a plug taper length which is defined as that distance from a reference circumference on the plug boundary to the terminated fiber end face which is the end face of the secondary pedestal. If the taper length is too long, the secondary pedestals may touch but there is not contact between the conforming surfaces; if it is too short, the plugs seat within the cavities of the sleeve, but the end faces of the fibers are spaced apart by too great a distance.

One problem with these kinds of connectors relates to the mounting of the plugs within the sleeve. In some installations, it becomes very difficult, if not impossible, to hold the cable while turning the cap into the housing of the coupling. If the plug is not held while the cap is turned into the housing in which the sleeve is disposed, the plug will turn the cap. If the plug turns, the end face of the plug and hence of the optical fiber terminated therewith may abrade against the plug and optical fiber already in the coupling, possibly causing damage to the optical fiber.

This problem may be overcome by causing the taper length to be such that a gap between the end faces is caused to exist. However, this results in increased insertion losses. These losses may be reduced by providing a quantity of optical index matching material within the cavities of the sleeve, after which the fibers are pushed into the cavities until their end faces engage the conically shaped walls to align the fibers and to place their end faces in close adjacency. The index matching material helps to reduce the transmission loss notwithstanding the fact that the end faces are not contacting. Although this arrangement may provide an adequate connection, it depends on an additional medium which may introduce contaminants at the junction of the optical fibers.

Another problem in attempting to provide a solution to the problem of unintended plug rotation relates to compatibility. With many biconic connectors already in use, it would be imprudent to provide plugs which overcome the problem of unwanted rotation but which are not compatible with sleeves already in use.

Seemingly, the prior art has not yet offered a simple solution to the problem of mounting conically shaped plugs which terminate optical fibers in a biconic coupling in a manner which avoids end face abrasion of the fibers. The sought-after connector should be one which provides for improved insertion loss and performance repeatability. Desirably, the plug and the sleeve of the sought-after connector are ones which are compatible with connectors that already are in use in the field.

SUMMARY OF THE INVENTION

The foregoing problems have been solved by the optical fiber connector of this invention. First and second plug assemblies each of which is adapted to terminate an optical fiber each includes a plug having a passageway which extends longitudinally therethrough and which is adapted to receive an end portion of an optical fiber such that an end face of the optical fiber terminates in an end face of the plug. Each plug assembly also includes a cap which encloses at least a portion of the plug and which is capable of being turned relative to the plug. At least one of the plug assemblies includes a key which is mounted on the plug and which projects toward the free end of the plug in which the end of the optical fiber terminates. The connector also includes a sleeve for receiving the plug of the first plug assembly in one end thereof and a plug of a second plug assembly in another and thereof with a mating surface of each plug engaging a conformable mating surface of the sleeve. The sleeve has at least one of its ends provided with a notch with the key of the at least one plug assembly being adapted to be disposed in the notch at the one end of the sleeve to prevent rotation of the plug with respect to the sleeve as relative rotational motion is caused between the cap of the at least one plug assembly and the sleeve.

In one embodiment, the plug has a truncated conically shaped end portion which is joined to a cylindrical portion. The plug is mounted in a cap having an externally threaded end portion beyond which extends the conically shaped end portion of the plug. A sleeve having opposed conically shaped cavities is mounted in a coupling housing which has internally threaded entrance portions. The threads in each entrance portion are recessed to allow a craftsperson to be able to insert the plug a sufficient distance to register the key of the plug with a notched peripheral portion of the sleeve prior to threadably turning the cap into the coupling housing to secure the cap to the housing.

BRIEF DESCRIPTION OF THE DRAWINGS

Other objects and features of the present invention will be more readily understood from the following detailed description of specific embodiments thereof when read in conjunction with the accompanying drawings, in which:

FIG. 8 is a preferred embodiment of a sleeve of this invention in which notches to be aligned with the core centroids are disposed along a common radial plane.

DETAILED DESCRIPTION

Figures 1, 1A:
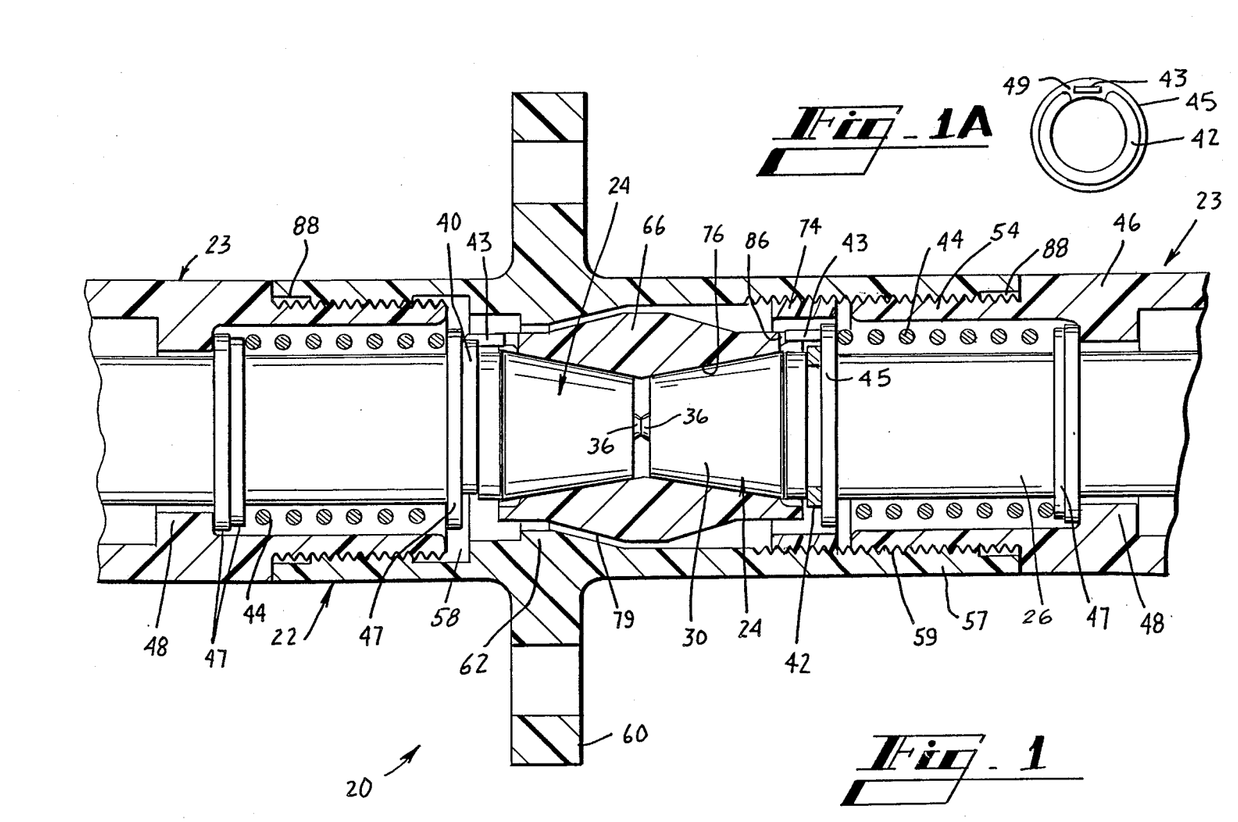
FIG. 1 is an elevational view of an assembled biconic connector for lightguide fiber cables which includes an alignment sleeve and two plugs each of which terminates an optical fiber.
FIG. 1A is a detail view of a retaining ring positioned adjacent to a washer which includes a key.
Figure 2:
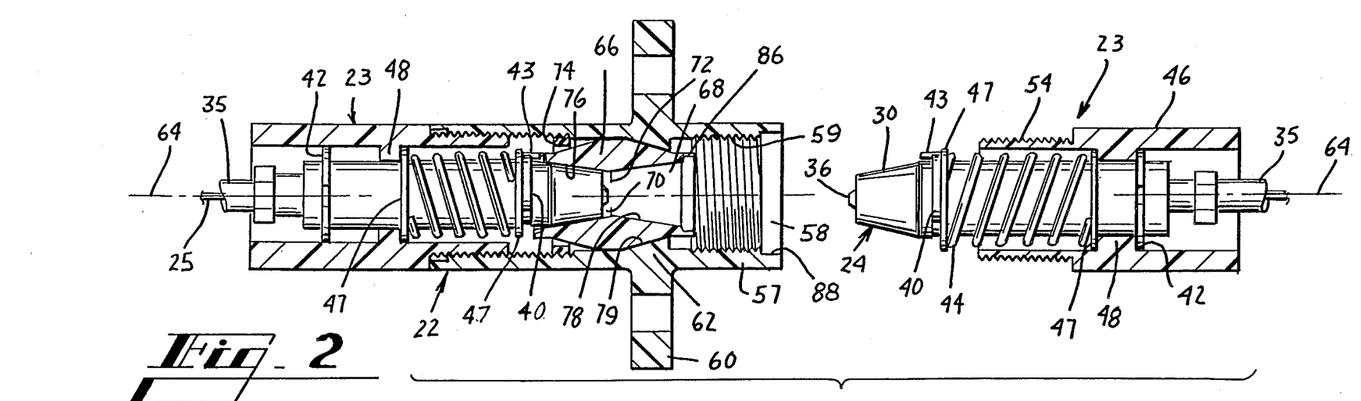
FIG. 2 is a partially exploded elevational view of the biconic connector of FIG. 1 with only one of the plugs disposed within a coupling housing.
Figure 3:
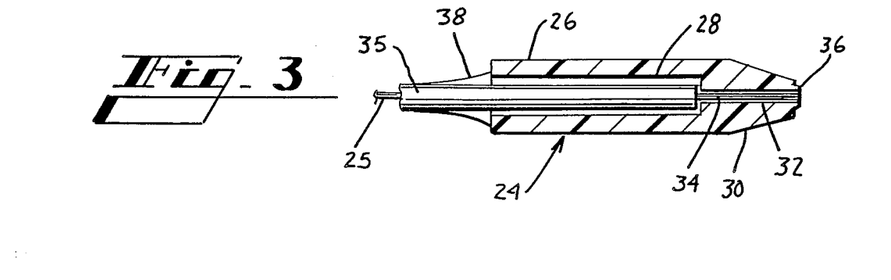
FIG. 3 is a detail view of a biconic plug of the connector of FIG. 1 with a single optical fiber terminated therewith.

Referring now to FIG. 1, there is shown a biconic connector designated generally by the numeral 20. The biconic connector 20 which is shown partially disconnected in FIG. 2 includes a coupling 22 for receiving two plug assemblies 23—23. It should be observed that FIGS. 1 and 2 are such that FIG. 2 is a view of FIG. 1 rotated 180° about a vertical axis. Each plug assembly 23 includes a plug 24 which terminates a lightguide or optical fiber 25 (see FIG. 3). As can be seen in FIG. 3, each plug 24 includes a cylindrical portion 26 which includes a bore 28, and an end portion 30. The end portion 30, which is referred to as a primary pedestal, has a truncated conical shape and includes a passageway 32 that communicates with the bore 28.

A coated single optical fiber 25 which has been jacketed with a plastic material such as polyvinyl chloride to form a cable 35 is terminated with the plug 24 (see again FIG. 3). The jacketing material and the coating are removed from an end portion 34 of the single fiber cable. Then, the cable is inserted into the bore 28 until the bared end portion 34 is received in the passageway 32 with an end portion of the fiber 25 extending into a secondary pedestal 36. An end face of the end portion 34 of the fiber 25 is coincident with the end face of the secondary pedestal 36. The cable at its exit from the bore 28 is provided with a strain relief member 38.

Figure 4:
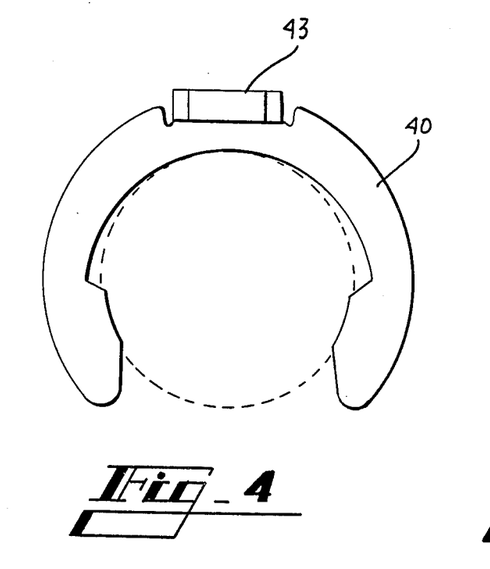
FIGS. 4 and 5 are end and side elevational views of a retaining ring which is provided with a locking key.
Figure 5:
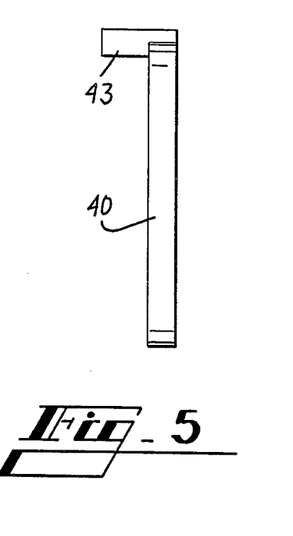
Figure 6:
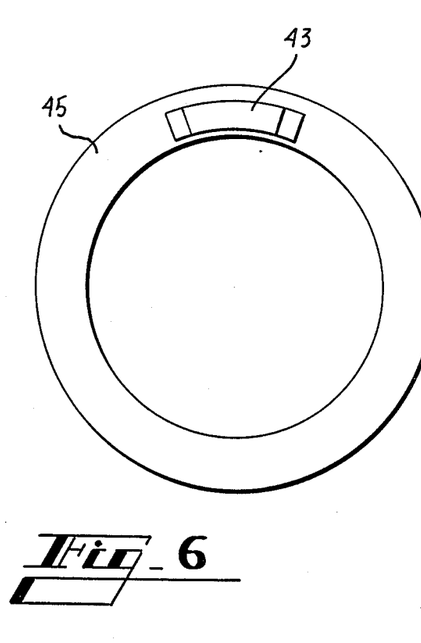
FIGS. 6 and 7 are end and side elevational views of a washer which is provided with a key to lock the plug against rotation during assembly of the connector.
Figure 7:
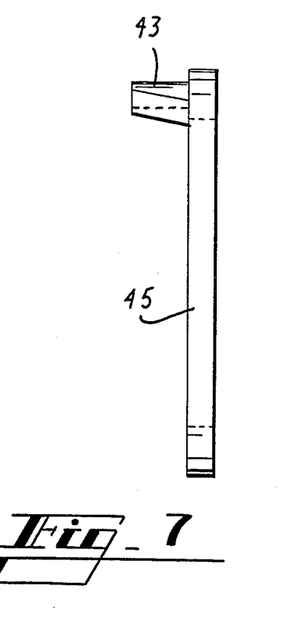

Each plug 24 is provided with a retaining ring and a washer adjacent to its end portion 30 (see FIGS. 1 and 2). As can be seen in the plug 24 shown on the left side of FIG. 1 and on the right side of FIG. 2, each of which plugs comprises a preferred embodiment of this invention, a retaining ring 40 is provided with a key 43 which projects toward a free end of the plug (see also FIGS. 4 and 5) and abuts a washer 47 which is fixedly located about the plug 24. In the alternative, which is shown on the right side of FIG. 1, a retaining ring 42 is disposed about the plug adjacent to its primary pedestal and a washer 45, instead of the retaining ring, is provided with the key (see also FIGS. 1A, 6 and 7). The washer 45 abuts the retaining ring 42 with the washer key 43 received in an opening 49 of the retaining ring 42 (see FIG. 1A). A compression spring 44 is disposed about the cylindrical portion 26 of the plug between the washer 45 and another washer 47 (see right side of FIG. 1) or between two washers 47—47 (see left side of FIG. 1). The plug 24 is positioned in an end portion of a holder or cap 46 with a washer 47 and another retaining ring 42 in engagement with an annular lip 48 to hold the plug within the holder. One end of the cap 46 includes an externally threaded portion 54 with the single fiber cable 35 extending from the other end of the cap.

As mentioned hereinbefore, the coupling 22 (see FIGS. 1 and 2) of the connector 20 is adapted to receive the two threaded plug caps 46—46 and two plugs 24—24. The coupling 22 comprises a housing 57 which includes two opposed cavities 58—58 each having a threaded portion 59 and which may or may not include a flange 60 adapted to be mounted to a supporting surface. The flange 60 is aligned with an internally disposed annular collar 62 which extends toward a longitudinal axis 64 (see FIG. 2) of the connector. The housing 57 of the coupling 22 also is adapted to receive an alignment sleeve 66 which comprises two opposed truncated, conically shaped cavities 68 and 70 which meet at a common plane 72.

Both the plugs 24 and the sleeve 66 are made of a crushed silica-filled, transfer molding grade epoxy composition, for example, whereas the housing 57 is made of a plastic material, for example. However, It should be understood that the plug and sleeve could be made of other materials, such as metallic materials, for example.

The alignment sleeve 66 is disposed within the housing 57 so that when the caps 46—46 and the external threaded portions 54—54 thereof are turned into internal threaded portions 59—59 in the cavities 58—58, the ends 30—30 of the plugs which are mounted in associated caps are received in the cavities 68 and 70 with the secondary pedestals 36—36 in the vicinity of the common plane 72. Also, as the threaded portions 54—54 of the caps 46—46 are turned into the housing 57, the plug portions 26—26 are moved through the openings defined by the lips 48—48 to move the retaining rings 42—42 out of engagement with the lips (see left side of FIG. 2). The retaining ring 40 of the left plug as viewed in FIG. 2 is adjacent to an externally threaded collar 74 which is turned threadably into the left cavity 58, as viewed in FIG. 2, or the right cavity as viewed in FIG. 1, and which holds the sleeve 66 within the housing 57. The collar 74 is threadably secured inside the coupling 22 and although not necessarily in engagement with the sleeve, it prevents the sleeve from being removed inadvertently from the housing. The spring 44 causes the plug end portion 30 to be seated firmly in engagement with a wall 76 of the alignment sleeve. Further, the right plug end 30 as viewed in FIG. 2 is moved into the cavity 68 of the sleeve 66 and contacts a wall 78. The sleeve 66 may float within an opening 79 in the collar 62 to facilitate alignment of the two plugs 24—24.

Ideally, to achieve minimum loss, the plugs 24—24 disposed within the sleeve 66 should have their longitudinal axes aligned and end faces of the fibers with the secondary pedestals 36—36 contacting each other. The outer surface of the conical end 30 of each plug 24 and the surfaces of the walls 76 and 78 of the sleeve cavities are associated conformable alignment surfaces which are intended to cause the desired positioning of the pedestals 36—36 when the conical ends of the plugs are received in the sleeve 66. When disposed in the alignment sleeve 66, the plugs 24—24 should have a required end separation based on the distance between the cavities 68 and 70. Likewise the so-called taper length of each plug should be a predetermined distance. As will be recalled, the plug taper length is defined as the distance from a reference circumference on the plug boundary to the end face of the secondary pedestal 36.

Figure 8:
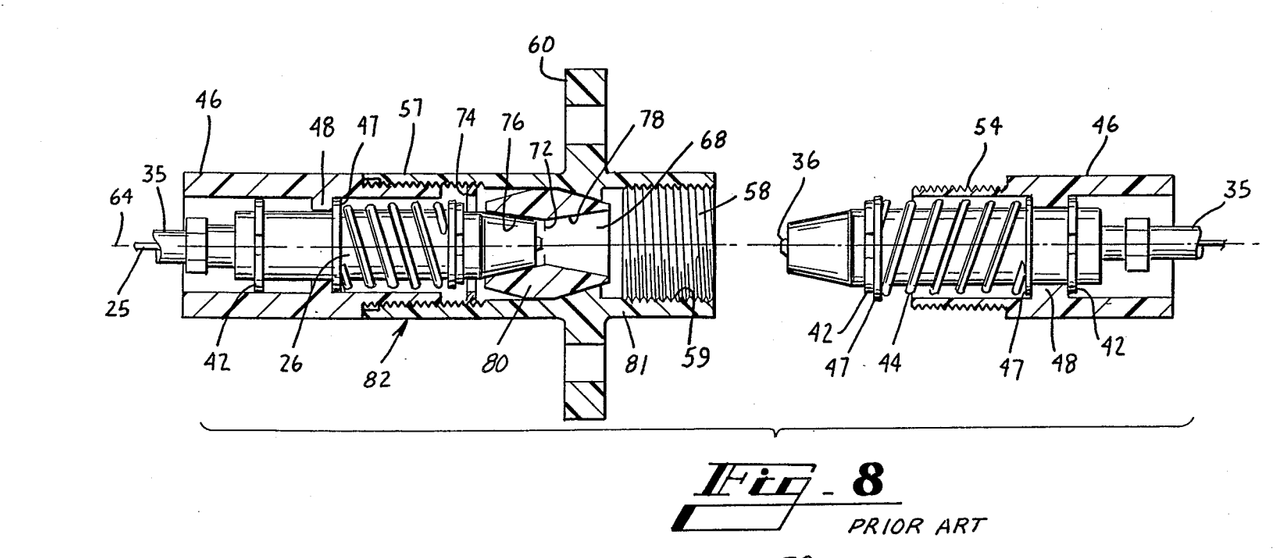
FIG. 8 is an elevational view of a prior art alignment sleeve with one prior art plug disposed therein and another prior art plug aligned with an opposite end thereof.

Turning now to FIG. 8, there is shown a prior art biconic connector. Corresponding elements of the connector of FIG. 8 and of FIG. 1 are designated with the same numeral. As can be imagined, after one plug 24 of the prior art connector has been inserted into a prior art sleeve 80 and its cap 46 turned into a housing 81 of a coupling 82, the turning of the cap of the other plug may cause the end faces of the optical fibers to abrade each other. This occurs because, as a craftsperson turns the cap 46, the plug therewithin, unless restrained, also tends to turn. As the plug 24 turns, the end face of the optical fiber terminated therein may abrade against the end face of the optical fiber terminated by the opposing plug already seated in the sleeve 66. Of course, the craftsperson could hold the cable 35 of the plug assembly being assembled to the housing 81 and hence prevent damage to the end face of the plug. However, this step may not be performed routinely by the craftsperson and further, it may not be possible to hold the cable. It would seem that the connector itself should incorporate a feature which overcomes this problem.

Accordingly, the connector 20 of this invention includes provisions for overcoming this problem. As will be recalled, the retaining ring 40 is such that it includes a key 43 which projects from the plane of the retaining ring and which is normal thereto (see left plug in FIG. 1 and FIGS. 4-5). With the retaining ring in place on the plug 24, the key 43 projects toward a free end of the truncated, conically shaped end portion of the plug. Although in the preferred emobidment the key 43 is formed on the retaining ring 40, it could just as well be provided on the washer 45 (see right plug of FIG. 1 and FIGS. 6-7) or on the plug 24 and at any angular orientation with respect to the plug.

The key 43 is intended to mate with portions of the coupling to prevent unintended rotation of the plug 24 as the cap 46 is secured to the coupling 22. To this end, the alignment sleeve 66 is provided with at least one notch 86 in a peripheral portion thereof (see FIGS. 1-2). In order to allow the key 43 to be received in a notch 86 when the truncated conically shaped portion of the plug 24 is disposed in engagement with a wall of the sleeve, the sleeve is grown, that is extended longitudinally, at each end where a notch is desired. Otherwise, a notched entrance end of the prior art sleeve does not extend far enough toward the entrance end of the coupling to receive the key 43.

Figure 9:
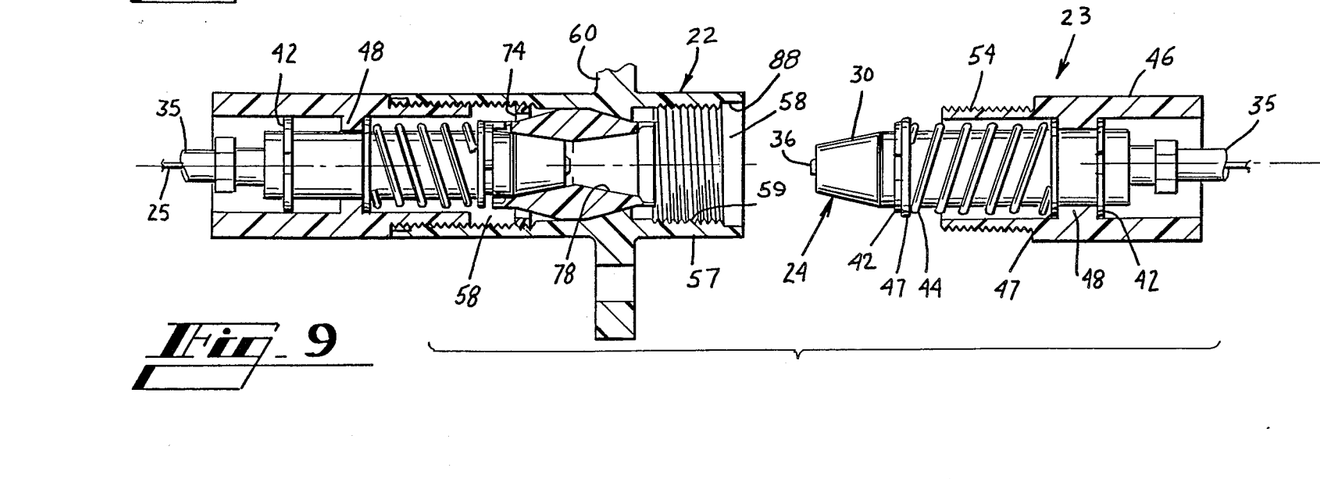
FIG. 9 is an elevational view of an alignment sleeve with a key-receiving slot at both of its ends and with one plug having a key inserted into one end thereof and one prior art plug aligned with another end thereof.
Figure 10:
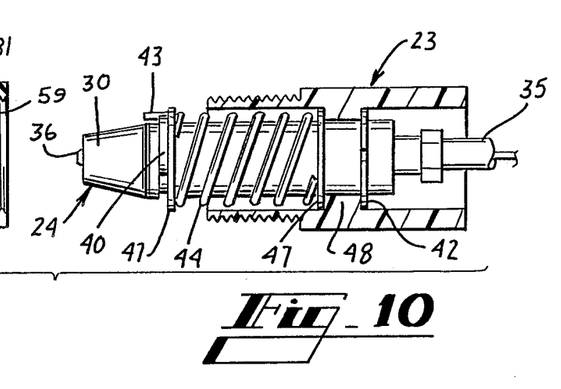
FIG. 10 is a view which shows partial assembly of a connector of this invention which includes a plug having a locking key assembled to a prior art sleeve and another plug having a key positioned for insertion into the sleeve.

It should be apparent that one end of a sleeve or both ends of the sleeve 66 (see FIGS. 1, 2 and 9) may be notched. If both ends are notched as shown in FIG. 9, a prior art plug 24 not having a key 43 may be assembled therewith. Further, it should be clear, especially in view of the foregoing, that if a prior art sleeve 80 is in place in a coupling housing, a plug assembly including a key 43 may be inserted into a coupling housing with the plug received in the sleeve without interference by the key (see FIG. 10).

Viewing now FIG. 1 in particular, it should be clear that because the threads of the cap 46 of a plug assembly 23 engages the housing 57 prior to the key 43 thereof being received in a notch 86, there is a lack of feel on the part of the craftsman that the key is entering the notch. To overcome this, the key 43 must be aligned with the notch 86 in the sleeve 66 before the cap 46 is turned into the threaded entrance portion of the coupling housing. This may be difficult to do in some uses of the connector. An end view of the coupling entrance for purposes of determining the location of the notch may not be possible because of interference by other equipment, for example.

This problem is overcome by counterboring the entrance portion of the coupling housing 57. More specifically, the threaded portion 59 is undercut as indicated by the numeral 88 so that the beginning of the threaded portion 59 is recessed slightly within the cavity 58. This allows a slight length of the threaded portion 54 of the cap 46 to be inserted into the coupling housing 57 without engaging the threads therein to allow the plug 24 to be turned until the key 43 is aligned with a notch of the sleeve.

The connector 20 of this invention is compatible with existing connectors in the field. For example, if all new jumper cables were to be provided with plugs 24—24 each having a keyed washer or a keyed retaining ring, it becomes important that such plugs would be useable with coupling housings and sleeves already in place in the field. Prior art sleeves have not been grown, that is, they have not been extended to allow a notch to be provided in the periphery thereof. Hence, when a keyed plug is turned into a housing having such an alignment sleeve therein (see FIG. 10), the key does not engage the sleeve. As a result, the fact that the plug is provided with a key does not impede its assembly with a prior art sleeve.

Figure 11:
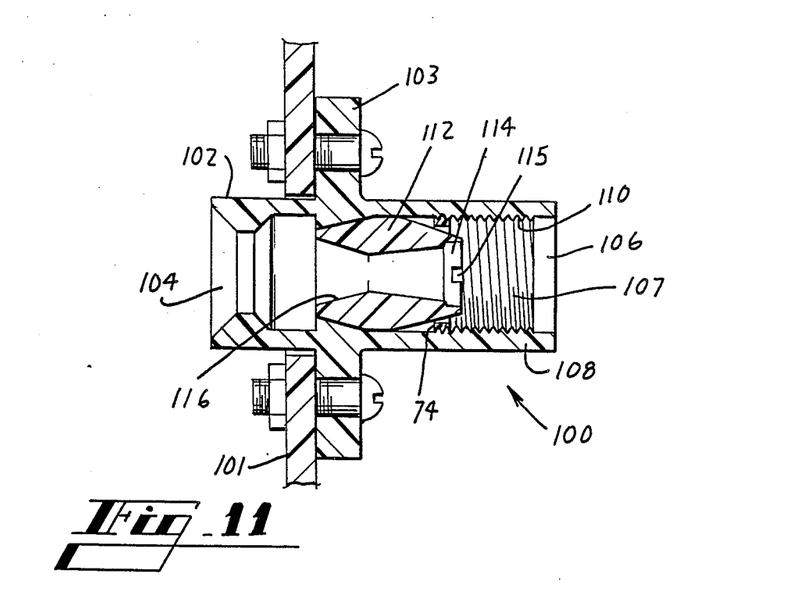
FIG. 11 is an elevational view in section which shows an alignment sleeve having one key-receiving notch positioned in a housing having internal threads at one end and a tapered cavity at its opposite end to accept a push-in plug.

Variations of the foregoing preferred embodiment are useful in particular installations. For example, in some equipment cabinets, circuit board packs are adapted to be moved slideably in tracks until one or more connectors on one end thereof are received in cavities of connector couplings 100—100 (see FIG. 11) which are mounted on a backplane 101. Typically, the connector coupling 100 which is depicted in FIG. 11 includes a housing 102 having a flange 103 which is adapted to be secured to the backplane. The housing 102 includes a tapered entrance 104 and an entrance 106. A wall 108 which defines the entrance 106 and a cavity 107 is provided with a threaded portion 110. An alignment sleeve 112, which is secured within the housing, includes an end 114 which is oriented toward the threaded portion 110 and which includes a notch 115. A collar 44 holds the sleeve 112 within the housing 102. In use, a circuit pack is moved to cause biconic plugs to be received in entrances 104—104 of connector couplings 100—100 mounted on the backplane 101. The truncated, conically shaped end portions of the plugs are received in unnotched ends 116—116 of the alignment sleeves 112—112. Subsequently, biconic connector plugs which are provided with keys are inserted into the entrances 106—106 of the connector couplings 100—100.

Instead of a connector coupling 100, a separable buildout block 119 and lightguide buildout 120 (see FIG. 12) may be used. The buildout block 119 includes a support portion 122 having a flange 124 which is secured to a backplane 101. The support portion 122 includes an entrance cavity 126 which is adapted to receive a plug that extends from a circuit board. On the opposite side of the panel, the buildout 120 includes two arcuately formed portions 127—127 which are diametrically opposed. Each of the arcuately disposed portions 127—127 includes a slot 128 for receiving a snap-lock tab 130 that extends radially from a housing 132 of the buildout 120. An alignment sleeve 112 which is the same sleeve used in the arrangement of FIG. 11 and which is secured by a ring 131 within the buildout 120 has one end 134 that is adapted to be received in a cavity 133 of the support portion. An opposite end of the housing 132 is provided with an entrance 136 having an internally threaded portion 138 and an unthreaded and counterbored entrance portion 139 for receiving the threaded cap of a keyed biconic plug.

Figure 12:
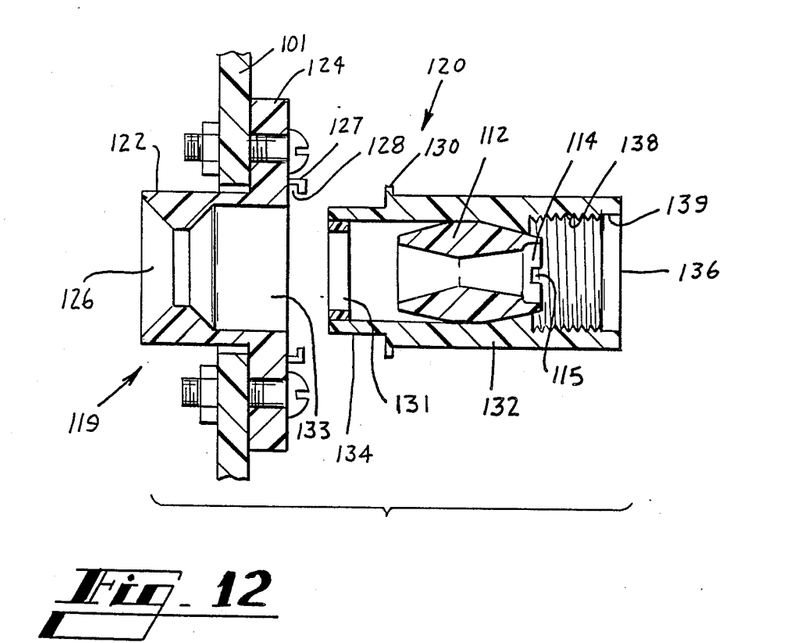
FIG. 12 is an exploded elevational view in section showing an alignment sleeve having a key-receiving notch and being disposed in a snap-in lightguide build-out and a single buildout block having a tapered entrance to accept a push-in plug.

For installation in FIG. 12, buildout blocks 119—119 are mounted to the backplane 101 after which lightguide buildouts 120—120 are assembled thereto. A biconic plug which terminates a single optical fiber cable is inserted into the entrance 136 of each buildout 120 and its cap turned threadably into the housing 132. Subsequently, a circuit pack is moved to cause its plugs to be received in the entrances 126—126 of the buildout blocks 119—119.

In another application of this invention, an equipment panel 140 (see FIG. 13) is used as an interconnection cabinet for bulkhead mounting connectors. The equipment panel 140 includes one or a plurality of buildout blocks 141—141, for example. A plurality of buildout blocks 141—141 may be provided in the backplane of the cabinet. An entrance cable is routed into the building and each optical fiber thereof is connected to a single fiber jumper cable which has an end terminated in a biconic connector. Each of these biconic connectors, which may be keyed or unkeyed, is inserted into an entrance end 142 of a housing 143 of a buildout block 141 which is secured to the panel 140 through a flange 144. It should be noted that the entrance of the buildout block is adapted to receive a plug which has or which does not have a key. As a result, an equipment panel has fibers of the cable connected to an array of buildout blocks which are secured to the panel. Subsequently, as particular ones of the optical fibers are to be connected to equipment, a lightguide buildout 120, which is the buildout of FIG. 12, is mounted to a block already in the panel through joining snap-lock tabs 130—130 into slots 128—128. As will be recalled, the buildout 120 includes a housing 132 having an end 134 adapted to be received in the flanged end of the buildout block and another end 136 which has an entrance defined by a wall that is provided with internal threads 138—138. An alignment sleeve 112 is secured within the buildout 120. The alignment sleeve has a notched end 114 which faces the entrance end 136. The notched end 114 is grown over that of a prior art alignment sleeve and includes a notch 115. Also, the entrance 136 is counterbored to provide a portion 139 without threads so that the beginning of the threads is recessed within the housing 132. After the buildout 120 has been mounted to the buildout block 141, a keyed plug 24 is inserted into the entrance 136 of the buildout 120 and its associated cap turned into the housing 132 of the buildout.

Figure 13:
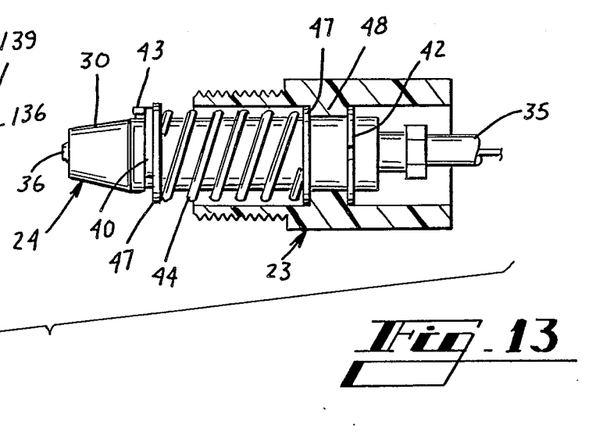
FIG. 13 is an exploded elevational view partially in section showing an alignment sleeve having one key-receiving notch and being positioned in a snap-in lightguide buildout, a buildout block having internal threads, and a plug having a key in position for insertion into the sleeve.

As for installation in FIG. 13, a biconic plug assembly, having or not having a key, is turned threadably into the entrance 142 of the buildout block 141 which is mounted on a panel 140 in the equipment cabinet. The plug to be received in the entrance end 142 terminates a fiber of the incoming cable and remains unused until such time as a buildout 120 is snap-lock inserted into a cavity 151 of the buildout block. No plug is in position on the other side 136 of the buildout at this time, hence the key is not necessary. However, when a jumper cable is installed into entrance 136 of the buildout 120, it is desired to use a keyed plug 24 inasmuch as its plug end is being connected to an alignment sleeve which already has a plug in one end thereof and damage thereto must be avoided.

As mentioned hereinbefore, the connector of this invention prevents unintended rotation of a plug relative to an alignment sleeve. Also, it provides for improved repeatability due to the key locating the fiber in the same position each time. The loss associated with the fiber position in the connector is repeated with each disconnection and reconnection because the plug is keyed into the sleeve which has been grown to allow a notch to be provided therein.

It should be apparent that other arrangements of the key 43 are included within the scope of this invention. For example, the key 43 could be formed integrally with the plug 24 instead of extending from the washer 45 or from the retaining ring 40 (see FIG. 13).

Figure 14:
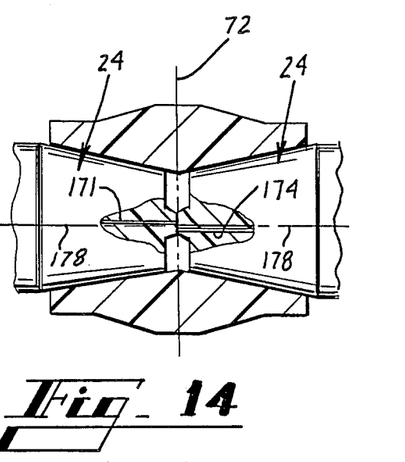
FIG. 14 is an elevational view, partially in section, of two prior art plugs in a prior art alignment sleeve with core centroids of optical fibers terminated by the plugs being oriented randomly within manufacturing tolerances.
Figure 15:
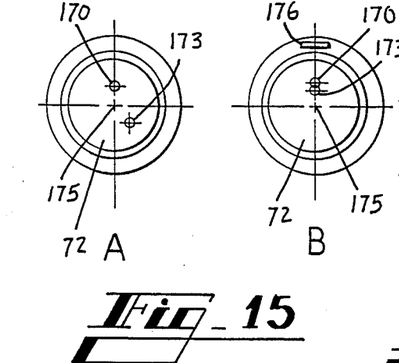
FIGS. 15A and 15B are schematic end views showing the position of core centroids of optical fibers along a common plane in the arrangement of FIG. 14, and in an arrangement in which keyed plugs and a notched alignment sleeve are used.
Figure 16:
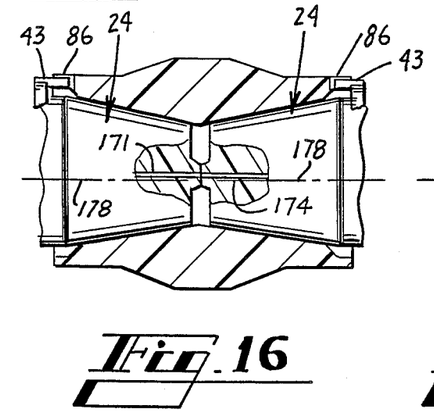
FIG. 16 is an elevational view, partially in section, of a sleeve having a notch at each end and two plugs each having a key with core centroids being oriented along a common radial plane.

Another advantage of this connector may be understood by viewing FIGS. 14-18. As is seen in FIGS. 14 and 15A, a core centroid 170 of an optical fiber 171 in an end face of a plug 24 along the common plane 72 generally is not disposed at a centroid 175 of the end face of the plug. Further, a core centroid 173 of an optical fiber 174 terminated in the common plane 72 also is not disposed at the centroid 175 of the end face of the plug which terminates the fiber 174. In order to facilitate interconnection of plugs with the cores thereof on the same side of a centroid 175 of the plug as shown in FIG. 15B, a locator 176 may be secured to each plug in a particular orientation with respect to the centroid of the fiber core. That locator, which may be the key 43, may be aligned radially with the centroid of the core (see FIGS. 15B and 16) or at some angle thereto (see FIG. 17) such as 90°, for example. In this way, the situation depicted in FIG. 15A wherein the core centroids are on radially opposite sides or randomly oriented sides of longitudinal axes 178—178 through the end face centroids 175—175 of the plugs is avoided. The orientation of the location may be indicated on the strain relief member 38 (see FIG. 3) or on the plug 24.

Figure 17:
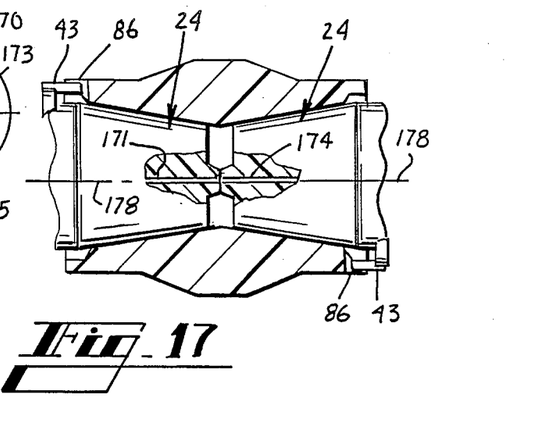
FIG. 17 is an elevational view, partially in section, of an alignment sleeve and two plugs therein with locators for the cores being displaced 180° from each other and fiber core centroids oriented to minimize insertion loss.
Figure 18:
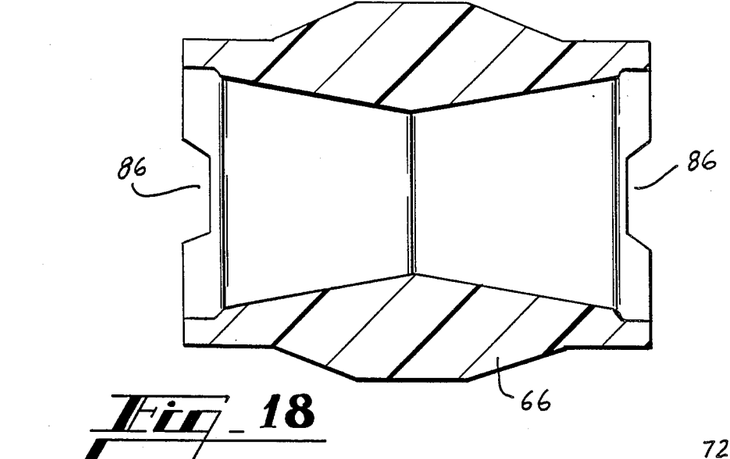

The keys 43—43 and notched sleeve may be arranged as shown in FIG. 17 wherein the notches 86—86 in the sleeve are 180° apart with each key displaced 90° from its core centroid. Although the core centroids appear along the axes 178—178 of FIG. 17, typically, they would be displaced along a plane through the axes 178—178. Both sleeve notches are visible, but again the optical fiber cores are along the same radial plane. In the preferred embodiment which is shown in FIG. 18, each key may be aligned radially with its core centroid so that, for example, in a plane view of the sleeve, notches 86—86 of the sleeve 66 are aligned.

It is to be understood that the above-described arrangements are simply illustrative of the invention. Other arrangements may be devised by those skilled in the art which will embody the principles of the invention and fall within tyhe spirit and scope thereof.

What is claimed is:

1. An optical fiber connector for connecting two optical fibers, said connector comprising:
   first and second plug assemblies each including a plug which includes a passageway which is adapted to receive an end portion of an optical fiber to terminate the optical fiber, and a cap which is disposed about and assembled to said plug such that relative rotational motion between said cap and said plug can occur, with at least one of said plug assemblies including key means which projects toward an end of the plug of said at least one plug assembly; and
   sleeve means for receiving the plug of said first plug assembly in one end thereof and the plug of said second plug assembly in another end thereof with a mating surface of each plug adapted to engage a conformable mating surface of said sleeve means, said sleeve means having at least one of its ends provided with a notch with the key means of said at least one plug assembly adapted to be disposed in the notch at one end of said sleeve means to prevent unintended relative rotation between said sleeve means and the plug of said at least one plug assembly as relative rotational movement is caused between said cap of said at least one plug assembly and said sleeve means to assemble the connector.

2. The optical fiber connector of claim 1, wherein each of said plug assemblies includes key means and said sleeve means has each of its ends provided with a notch with key means of said first plug assembly adapted to become disposed in the notch at one end of said sleeve means and the key means of said second plug assembly adapted to become disposed in the notch at the other end of said sleeve means.

3. An optical fiber connector adapted to provide a connection between two optical fibers, said connector including:
   a housing
   first and second plug assemblies, each including a plug which includes a passageway which is adapted to receive an end portion of an optical fiber to terminate the optical fiber, a cap which is assembled to said plug such that relative rotational motion between said cap and said housing can occur and which is assembled to said housing as a result of relative rotary motion between said cap and said housing, and key means mounted on and projecting toward an end of said plug; and
   sleeve means adapted to be disposed in said housing for receiving said plug of said first plug assembly in one end thereof and said plug of said second plug assembly in another end thereof, said sleeve means having each of its ends provided with a notch with said key means of one of said plug assemblies adapted to be received in the notch at one of its ends and said key means of the other one of the plug assemblies in the notch at the other one of its ends to prevent unintended rotation of each plug relative to the sleeve as said cap of each plug assembly is turned into engaging assembly with said housing.

4. The optical fiber connector of claim 3, wherein said cap of each of said plug assemblies includes a threaded portion and said housing includes a threaded portion at each of opposed ends and the cooperation of the key means of a plug with a notch prevents unintended rotation of the plug relative to said sleeve as the threaded portion of the cap associated with the plug is turned into engagement with a threaded end of said housing.

5. The optical fiber connector of claim 4, wherein said plug of each plug assembly includes a truncated conically shaped end portion and a cylindrical portion connected thereto, said truncated conically shaped portion extending beyond said cap, said cylindrical portion having a compression spring disposed thereabout to bias said plug into said sleeve means with each end of said spring engaging a washer which is disposed about said plug and wherein a retaining ring is disposed about said cylindrically shaped portion adjacent to said truncated conically shaped portion and in engagement with one of the washers.

6. The optical fiber connector of claim 5, wherein an annular member which is disposed about each said plug includes key means extending in a direction along a longitudinal axis of said plug toward a small diameter end portion of said plug.

7. The optical fiber connector of claim 6, wherein the retaining ring of each plug includes a key that projects toward a small diameter end of the truncated conically shaped portion of the plug.

8. The optical fiber connector of claim 6, wherein the washer of each plug which is adjacent to the truncated conically shaped end portion of the plug includes a key that projects toward a small diameter end of the truncated conically shaped portion of the plug.

9. The optical fiber connector of claim 5, wherein said housing includes cavities in opposed ends thereof, each of said cavities being adapted to receive the truncated conically shaped end portion of one of said plugs, further each of said cavities being defined by a wall including a threaded portion which is recessed from an entrance portion of said each cavity.

10. A kit of parts adapted to provide a connection between two optical fibers, said kit including:
 a housing;
 first and second plug assemblies, each including a plug which includes a passageway adapted to receive an end portion of an optical fiber to terminate the optical fiber, a cap which is adapted to be assembled to said plug such that relative rotational motion between said cap and said plug can occur and which is adapted to be assembled to said housing as a result of relative rotary motion between said cap and said housing, and key means adapted to be mounted on and projecting toward an end of said plug; and
 sleeve means adapted to be disposed in said housing for receiving said plug of said first plug assembly in one end thereof and said plug of said second plug assembly in another end thereof, said sleeve means having each of its ends provided with a notch with said key means of one of said plug assemblies adapted to be received in the notch at one of its ends and said key means of the other one of the plug assemblies in the notch at the other one of its ends to prevent unintended rotation of each plug relative to the sleeve as said cap of each plug assembly is turned into engaging assembly with said housing.

11. A plug assembly for terminating an optical fiber, said plug assembly comprising:
 a cap;
 a plug which includes a passageway extending therethrough and which is mounted in said cap such that relative rotational motion between said cap and said plug can occur, said passageway being adapted to receive an end portion of an optical fiber; and
 key means connected to said plug and projecting toward an end of said plug, said key means adapted to be received in a notch of a sleeve which is adapted to receive said plug with a mating surface of said plug adapted to engage a conformable mating surface of the sleeve as a result of relative rotational motion between said cap and the sleeve, said key means preventing rotation between the sleeve and said plug during relative rotational motion between said cap and the sleeve.

12. The plug assembly of claim 11, wherein said cap is adapted to be assembled to a housing as a result of rotary motion between said cap and the housing, said plug mounted in said cap with said cap enclosing at least a portion of said plug, said passageway adapted to receive an optical fiber therein such that the optical fiber terminates in an end face of the plug and extends from the cap beyond an end thereof, and said key means adapted to be received in a notch of a sleeve being disposed in the housing.

13. The plug assembly of claim 12, wherein said plug has a truncated conical shape and an annular member which is disposed about said plug includes key means extending in a direction along a longitudinal axis of said plug toward a small diameter end portion of said plug.

14. The plug assembly of claim 13, wherein said annular member includes a retaining ring which is adapted to be mounted on said plug and which includes a key that projects toward the small diameter portion of said plug.

15. The plug assembly of claim 13, wherein said annular member includes a washer which is mounted on said plug and which includes a key that projects toward a small diameter end of the plug.

16. The plug assembly of claim 13, wherein said key means is mounted on said plug such that the centroid of said passageway in the small diameter end face of said plug and said key means are disposed in a common plane which extends radially from a longitudinal axis of said plug.

17. A plug assembly which terminates an optical fiber, said plug assembly comprising:
 a cap which is adapted to be assembled to a housing as a result of rotary motion between said cap and the housing;
 a truncated conically shaped plug which includes a passageway extending therethrough and which is mounted in said cap such that said cap encloses at least a portion of the plug and such that relative rotational motion between said cap and said plug can occur;
 an optical fiber which is positioned in the passageway of said plug and which terminates in an end face of the plug, said optical fiber extending from said cap beyond an end thereof; and
 key means mounted on said plug and projecting toward a free end of said plug, said key means adapted to be received in a notch of a sleeve which is disposed in the housing and which is adapted to receive said plug to prevent unintended rotation of said plug with respect to said sleeve when relative rotary motion is caused between said cap and the housing.

18. The plug assembly of claim 17, wherein said cap includes a threaded portion and the housing to which said cap is adapted to be assembled includes a threaded entrance portion such that said key means of said plug is adapted to be received in the notch of the sleeve to prevent rotation of said plug with respect to the sleeve when said cap is turned into threaded engagement with the housing.

19. The plug assembly of claim 17, wherein said cap includes a first cavity and a second cavity with the first cavity separated from the second cavity by an annular ledge, the portion of the cap which defines said first cavity being threaded externally, and the plug includes a truncated conically shaped end portion and a cylindrically shaped portion which is disposed in said cap with the conically shaped end portion extending beyond said cap and wherein the plug assembly further includes:

retaining rings disposed about said cylindrical portion of said plug with one of the retaining rings disposed on one side of said annular ledge for holding said plug in said cap, and another retaining ring being disposed adjacent to the truncated conically shaped end portion of the plug and having a key which projects toward a free end of said conically shaped portion;

a pair of washers disposed about said cylindrical portion of said plug, one adjacent to its juncture with the conically shaped portion and the other adjacent to said annular ledge; and a compression spring which is disposed between said washers to cause said plug to be urged outwardly of said cap.

20. The plug assembly of claim 17, wherein said optical fiber includes a core having a centroid and a cladding which is disposed about said core and said key means is mounted on said plug such that said centroid of said core of said optical fiber in the end face of said plug and said key means are disposed in a common plane which extends radially from a longitudinal axis of said plug.

21. A coupling for connecting an optical fiber which is terminated by a plug with another light path, said coupling including a housing and an alignment sleeve disposed in said housing; said alignment sleeve being adapted at one of its ends to receive a plug which terminates an optical fiber, said sleeve being defined by a wall having a surface which is substantially conformable to and which mates with a surface of a plug with one end of the sleeve being provided with a notch which is adapted to receive a key which projects from a plug that is to be received in the one end, wherein a plug is assembled with a cap which includes an externally threaded portion, and said housing has an entrance portion which communicates with the one end of the sleeve having the notch and which has an internally threaded portion, the cooperation of the key of a plug with said notch being effective to prevent unintended rotation of a plug relative to said sleeve as the threaded portion of the cap associated with the plug is turned into engagement with the threaded portion of the housing, the internally threaded portion of said housing being recessed from an end of said entrance portion.

22. An optical fiber connection, which includes:

a coupling which includes a housing having opposed cavities each of which has an internally threaded portion which is recessed within said each cavity;

first and second plug assemblies each being mounted in one of said cavities of said housing and including:

a plug having a passageway extending therethrough;

a cap in which said plug is mounted and which includes a threaded portion engaged with a threaded portion of said housing, said cap capable of being turned rotatably with respect to said plug; and an optical fiber which is disposed in the passageway of each of said plugs with an end of each fiber terminating in an end face of the plug in which it is mounted, with at least one of said plug assemblies including key means projecting toward a free end of the at least one plug assembly; and sleeve means disposed in said housing and having opposed cavities in each of which is disposed one of said plugs, said sleeve means including walls which define the cavities thereof and which include surfaces conformable to and mating with outer surfaces of said plugs, with at least one of the walls which define one of the cavities of said sleeve means being provided with a notch in which is disposed the key means of said at least one plug assembly which prevented unintended rotation of the plug relative to the sleeve when the cap was turned into threaded engagement with said housing of said coupling.

* * * * *